UNITED STATES PATENT OFFICE.

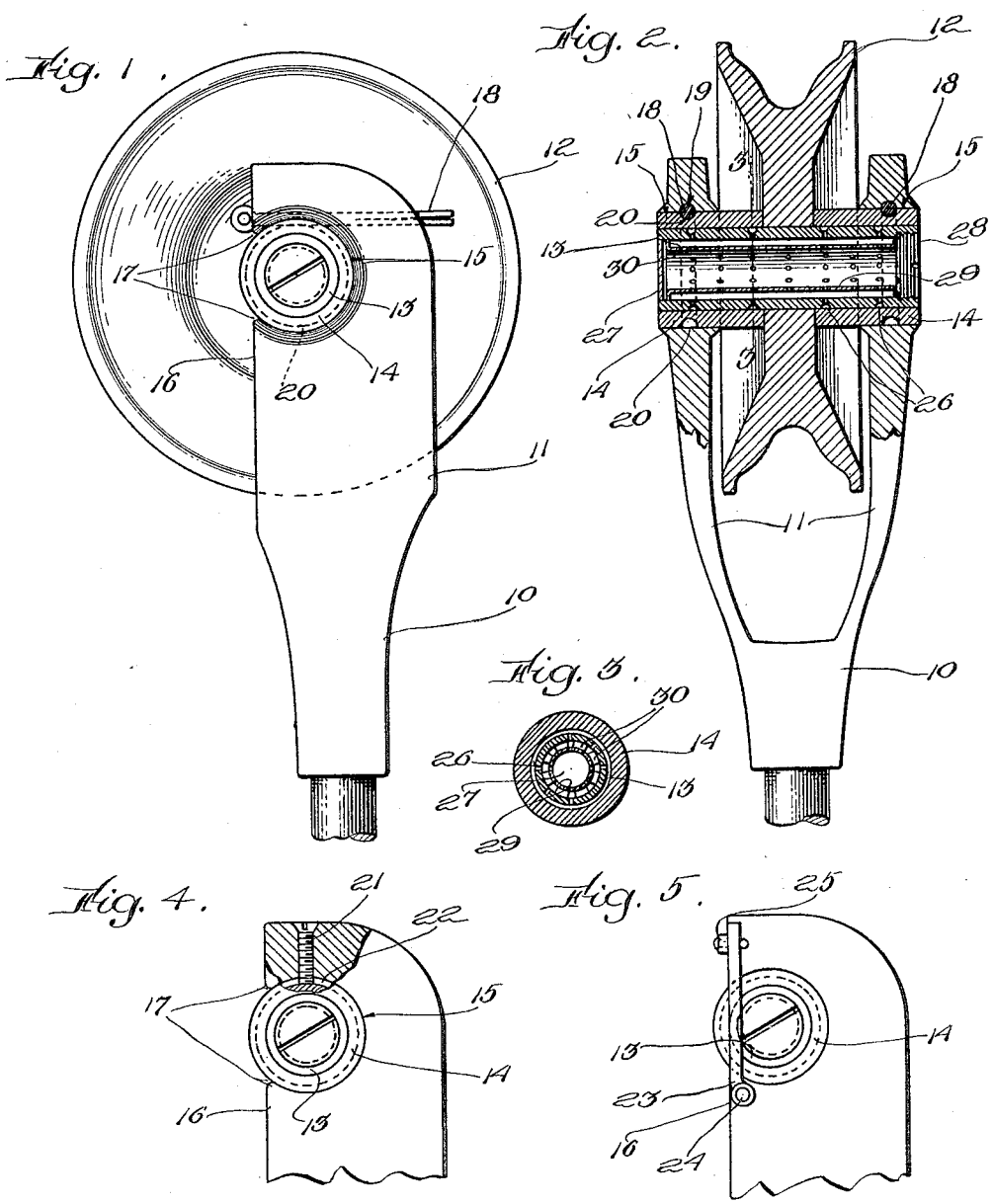

MINAS H. KASHIAN, OF AMESBURY, MASSACHUSETTS.

TROLLEY-HEAD.

1,134,136.  Specification of Letters Patent.  Patented Apr. 6, 1915.

Application filed September 9, 1911. Serial No. 648,566.

*To all whom it may concern:*

Be it known that I, MINAS H. KASHIAN, a citizen of the United States, and resident of Amesbury, in the county of Essex and State of Massachusetts, have invented an Improvement in Trolley-Heads, of which the following description, in connection with the accompanying drawings, is a specification, like letters on the drawings representing like parts.

This invention relates to trolley heads and has to do particularly with an improved mounting of the trolley wheel in the forks of the head whereby it is firmly and securely held in its bearings with a capability of quick and convenient removal whenever required for inspection or replacement of parts or other reasons.

A further feature of the invention relates to an improved arrangement of parts for convenient and effective lubrication of the trolley wheel bearings whereby an adequate supply of lubricant, without an excessive delivery thereof, is insured.

The above and other detail features of the invention will be more fully understood from the following detailed description taken in connection with the accompanying drawings, and will thereafter be pointed out in the appended claims.

Referring to the drawings, Figure 1 is a side elevation of my improved trolley head. Fig. 2 is a central transverse section through the improved parts of the head, the supporting harp being shown in elevation. Fig. 3 is a detail section on line 3—3 of Fig. 2. Fig. 4 is a fragmentary detail showing one feature of the invention modified, and Fig. 5 is a similar fragmentary detail showing a further modified form of the same feature.

The trolley harp 10 has a general construction of usual or any desired form, with the usual forks 11 to embrace the trolley wheel 12. This wheel is pressed or otherwise tightly fitted to a tubular axle 13 with walls of a thickness to provide sufficient strength and wearing quality, while providing an interior chamber of sufficient size to hold a considerable supply of lubricant. The sleeve axle 13 is of a length so that its ends are substantially flush with the outer sides of the harp forks, as shown, and its ends have bearings in bushing collars 14 which may extend inward to fit against the sides of the trolley wheel, their outer ends being preferably flush with the outer sides of the harp forks. The forks 11 near their outer ends are provided with sockets 15 to receive the bearing collars 14, these sockets being located adjacent one side of the forks and opening at one side thereof to the flat edges 16 of the forks. The walls of these sockets thus extend around through considerably more than half a circle so as to securely embrace the bearing collars, but the openings 17 formed by the intersection of the edges 16 therewith are of a width as great or greater than the diameter of the sleeve axle 13, so that upon removal of the bearing collars the ends of the sleeve axle can be passed therethrough and the trolley wheel thus removed laterally. The bearing collars 14 are adapted to be slid into place in their sockets 15 after the axle has been placed therein. Any suitable means may be provided for holding the bearing collars in operative position and against casual displacement and in Figs. 1 and 2 I have shown such means as consisting in locking pins 18 split at their ends and inserted in sockets 19 formed partly as holes extending transversely through the forks opening into the bearing sockets and the complement of these pin sockets being formed as recesses 20 in the bearing collars. Other possible means for holding these bearing collars in place are shown in Figs. 4 and 5, that of Fig. 4 consisting of screw bolts 21 threaded through the ends of the sockets and engaging in grooves 22 in the bearing collars, while in Fig. 5 latches 23 are pivoted to the sides of the sockets at 24, these latches fitting down over the flush ends of the collars and being locked from displacement by buttons or wing nuts 25 at the adjacent edge of the forks.

The sleeve axle 13, as stated, has an interior bore of a size to receive a substantial amount of lubricant and oiling grooves 26 may be formed in the outer periphery thereof with openings to the interior bore for properly spreading the lubricant over the bearing surfaces. The ends of the tubular axle are closed, as shown, one by a fixed closure 27 and the other by a removable screw plug 28. The lubricant employed is preferably of a solid or semi-solid form at lower temperatures and adapted to be liquefied when heated. Such lubricant may be placed in the bore of the tubular axle directly, but as the heating of this axle in use is apt to liquefy the lubricant in the bore to such an extent that it will flow out in excess quantities, I preferably provide a perforated inner tube spaced away from the walls of the axle bore as the immediate holder of the lubricant. This tube, as shown at 29, extends between the end closures of the axle bore and is held spaced away from the walls of the bore by having lugs 30 upturned therefrom at its ends to fit the walls of the bore. This tube, which may be of sheet metal construction, is provided with holes along the length thereof and when filled with a suitable lubricant, sufficient heat is transmitted thereto so that it is liquefied to an extent requisite for properly oiling the bearings but owing to the space between the walls of this inner tube and the interior walls of the axle bore, excessive heating of the lubricant is avoided and thus it is not liquefied faster than required for use.

The trolley head thus provided is composed of a relatively small number of parts which can be very quickly and conveniently assembled or taken apart as required, the operation of taking out the wheel only requiring that the pins 18 or equivalent fastenings be withdrawn when the bearing collars can be slid out endwise and the wheel then laterally removed from the forks; the parts can likewise be instantly reassembled since there is practically no chance for a misplacing of any element, and when assembled the bearings are rigidly and securely held from any chance displacement.

An important feature of my present invention is that the bushings being in pairs and each readily removable independently of the other, either may be removed and replaced without removing the trolley wheel from the harp. As it is often necessary to inspect these bushings because of the electrical contact which they afford, it is important that means for the removal and replacement of such bushings be provided. Furthermore a firm and solid bearing in the direction of pressure is afforded from one point 17 to the other in the head 10, by relatively small openings through the harp 10 between the points 17, being in that part of the cylindrical socket for the axle which takes no wearing strain during the ordinary operation of the trolley head.

Having described my invention, what I claim as new and desire to secure by Letters Patent is:

1. A trolley head consisting of a pair of forks having cylindrical open sided sockets therein, a trolley wheel having an axle arranged with its ends extending into said sockets and a pair of removable bushing collars, each fitted to one of the sockets in each fork and forming bearings for the axle, each bushing being removable independently of the other bushing, and while the trolley wheel is held in assembled position with relation to said forks, the sockets being open sided sufficiently to permit lateral movement of the axle therethrough.

2. A trolley head, consisting of a pair of forks having cylindrical sockets therein, a trolley wheel having an axle arranged with its ends extending into said sockets, a pair of removable bushing collars each fitted to one of the sockets in each fork and forming bearings for the axle, said sockets having a peripheral opening to permit removal of the axle therethrough, said bushings each being provided with a peripheral recess, and means secured to the forks adjacent said bearings for engaging the recess in the bushing to hold the same from longitudinal movement.

3. A trolley head, consisting of a pair of forks having open sides cylindrical sockets therein, a trolley wheel having an axle arranged with its ends extending into said sockets, a pair of removable bushing collars each fitted within the respective sockets, said open sockets being formed to embrace the bushings permitting axial removal of the bushings and lateral removal of the axle through the openings of said sockets, and a pin carried by each fork to engage the bushing therein and prevent its endwise removal.

In testimony whereof, I have signed my name to this specification, in the presence of two subscribing witnesses.

MINAS H. KASHIAN.

Witnesses:
ROBERT C. CLARK,
EARL M. NELSON.

It is hereby certified that in Letters Patent No. 1,134,136, granted April 6, 1915, upon the application of Minas H. Kashian, of Amesbury, Massachusetts, for an improvement in "Trolley-Heads," an error appears in the printed specification requiring correction as follows: Page 2, line 85, for the word "sides" read *sided;* and that the said Letters Patent should be read with this correction therein that the same may conform to the record of the case in the Patent Office.

Signed and sealed this 27th day of April, A. D., 1915.

[SEAL.]

J. T. NEWTON,
*Acting Commissioner of Patents.*